(12) United States Patent
Kato et al.

(10) Patent No.: US 10,393,970 B2
(45) Date of Patent: Aug. 27, 2019

(54) OPTICAL MODULE

(71) Applicant: Fujitsu Optical Components Limited, Kawasaki-shi, Kanagawa (JP)

(72) Inventors: Hiroshi Kato, Kawasaki (JP); Seimi Sasaki, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/678,568

(22) Filed: Aug. 16, 2017

(65) Prior Publication Data

US 2018/0120522 A1    May 3, 2018

(30) Foreign Application Priority Data

Oct. 28, 2016  (JP) ................. 2016-211847

(51) Int. Cl.
| | |
|---|---|
| *G02B 6/42* | (2006.01) |
| *G02F 1/225* | (2006.01) |
| *G02F 1/21* | (2006.01) |
| *G02B 6/30* | (2006.01) |

(52) U.S. Cl.
CPC ......... *G02B 6/4206* (2013.01); *G02B 6/4213* (2013.01); *G02B 6/4257* (2013.01); *G02B 6/4295* (2013.01); *G02F 1/225* (2013.01); *G02F 1/2252* (2013.01); *G02B 6/30* (2013.01); *G02B 6/4286* (2013.01); *G02F 2001/212* (2013.01); *G02F 2201/58* (2013.01)

(58) Field of Classification Search
CPC .. G02B 6/4206; G02B 6/4213; G02B 6/4257; G02B 6/4295; G02F 1/2252; G02F 2001/212
See application file for complete search history.

(56) References Cited

U.S. PATENT DOCUMENTS

| | | | | |
|---|---|---|---|---|
| 6,819,872 | B2 * | 11/2004 | Farries ................. | G02B 6/2861 398/102 |
| 9,081,139 | B2 * | 7/2015 | Okamura ............... | G02B 6/125 |
| 9,405,081 | B2 * | 8/2016 | Maruyama ........... | G02B 6/4244 |
| 2003/0206707 | A1 * | 11/2003 | Richard .................... | G02B 6/32 385/129 |
| 2006/0056002 | A1 * | 3/2006 | Wooten ................... | G02F 1/225 359/245 |

(Continued)

FOREIGN PATENT DOCUMENTS

JP    2015-169795    9/2015

*Primary Examiner* — Peter Radkowski
(74) *Attorney, Agent, or Firm* — Staas & Halsey LLP

(57) ABSTRACT

An optical module includes a substrate with a plurality of pairs, which are parallel to each other, spaced in a width direction of the substrate, of optical waveguides formed thereon, each pair being made up of a first optical waveguide that guides a first beam and a second optical waveguide that guides a second beam that monitors the first beam, and a lens that has an incident surface facing at least one pair of the plurality of pairs, collimates, for each of the at least one pair, the first and second beams that emerge from the pair and that differ from each other in at least any one of their incident positions and incident directions on the incident surface, and directs the first and second beams having been collimated and leaving the lens in different directions that depend on the incident positions or the incident directions.

7 Claims, 5 Drawing Sheets

(56) References Cited

U.S. PATENT DOCUMENTS

| | | | |
|---|---|---|---|
| 2011/0255147 A1* | 10/2011 | Oguri | G02B 6/126 359/303 |
| 2012/0183252 A1* | 7/2012 | Okamura | G02B 6/125 385/2 |
| 2013/0256516 A1* | 10/2013 | Mochizuki | G01J 1/0204 250/226 |
| 2015/0253521 A1* | 9/2015 | Maruyama | G02B 6/4244 385/11 |

* cited by examiner

OPTICAL MODULE

CROSS-REFERENCE TO RELATED APPLICATION

This application is based upon and claims the benefit of priority of the prior Japanese Patent Application No. 2016-211847, filed on Oct. 28, 2016, the entire contents of which are incorporated herein by reference.

FIELD

The embodiments discussed herein are related to optical modules.

BACKGROUND

Optical modulators that use a semiconductor, e.g., indium phosphide (InP), have been developed in recent years in the field of optical communication systems. Optical modulators that use a semiconductor can be miniaturized more easily than optical modulators that use a ferroelectric crystal, such as lithium niobate ($LiNbO_3$). However, because an optical modulator that uses a semiconductor confines light strongly therein, an angle of divergence of modulated light emerging from an optical waveguide into space is relatively large. The modulated light emerging from the optical waveguide into space contains a signal beam and a monitoring beam for use in monitoring the signal beam. An increase in the angle of divergence of the modulated light can cause interference between signal beams or interference between monitoring beams and therefore is unpreferable.

Under the circumstances, to reduce the increase in the angle of divergence, collimating lenses may be arranged downstream of a substrate where optical waveguides are formed. The collimating lenses are typically arranged in one-to-one correspondence with optical waveguides that guide signal beams and optical waveguides that guide monitoring beams; each of the collimating lenses collimates the signal beam or the monitoring beam emerging from a corresponding one of the optical waveguides. The collimated signal beam and the collimated monitoring beam, each leaving a corresponding collimating lens, are directed in the same emergent direction.

However, when the signal beam and the monitoring beam, each leaving a corresponding collimating lens, are directed in the same emergent direction, a limitation can be imposed on a layout of one or more optical components downstream of the collimating lenses. For instance, an arrangement where a polarization beam combiner that polarization couples signal beams and light-receiving elements that receive monitoring beams are arranged downstream of the collimating lenses will impose a limitation on positional relationship between the polarization beam combiner and the light-receiving elements. Hence, it is preferable that a signal beam and a monitoring beam, each leaving a corresponding collimating lens, are directed in directions that differ from each other. Specifically, schemes currently under study include displacing an optical axis of each of collimating lenses that collimates a signal beam or a monitoring beam from an optical axis of a corresponding optical waveguide, thereby directing the signal beam and the monitoring beam leaving the collimating lenses in directions that differ from each other.

[Patent Document 1] Japanese Laid-open Patent Publication No. 2015-169795

However, the configuration where the optical axis of each collimating lens that collimates the signal beam or the monitoring beam is displaced from the optical axis of the corresponding optical waveguide presumes that collimating lenses are arranged in one-to-one correspondence with optical waveguides. Hence, when the above-described configuration is applied to, for instance, an optical modulator, as the number of the optical waveguides increases, the number of the collimating lenses increases. This makes it difficult to miniaturize the optical modulator as desired. This holds true with apparatuses other than optical modulators as well. In an apparatus where collimating lenses are arranged downstream of a substrate where optical waveguides are formed, the collimating lenses are arranged in one-to-one correspondence with the optical waveguides, which disadvantageously limits miniaturization of the apparatus.

SUMMARY

According to an aspect of an embodiment, an optical module includes a substrate with a plurality of pairs of optical waveguides formed thereon, the pairs being parallel to each other, spaced in a width direction of the substrate, each pair being made up of a first optical waveguide that guides a first beam and a second optical waveguide that guides a second beam for use in monitoring the first beam; and at least one lens, each lens having an incident surface facing at least one pair of the plurality of pairs of optical waveguides, collimating, for each of the at least one pair, the first beam emerging from the pair and incident on the incident surface from an incident direction at an incident position and the second beam emerging from the pair and incident on the incident surface from an incident direction at an incident position, the first beam and the second beam differing from each other in at least any one of the incident position and the incident direction, and directing the first beam and the second beam having been collimated and leaving the lens in different directions that depend on, when the first beam and the second beam differ from each other in one of the incident position and the incident direction, the one of the incident position and the incident direction and that depend on, when the first beam and the second beam differ from each other in both of the incident position and the incident direction, the both of the incident position and the incident direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiments are not intended to limit the disclosed technology in any way.

[a] First Embodiment

Figure 1:
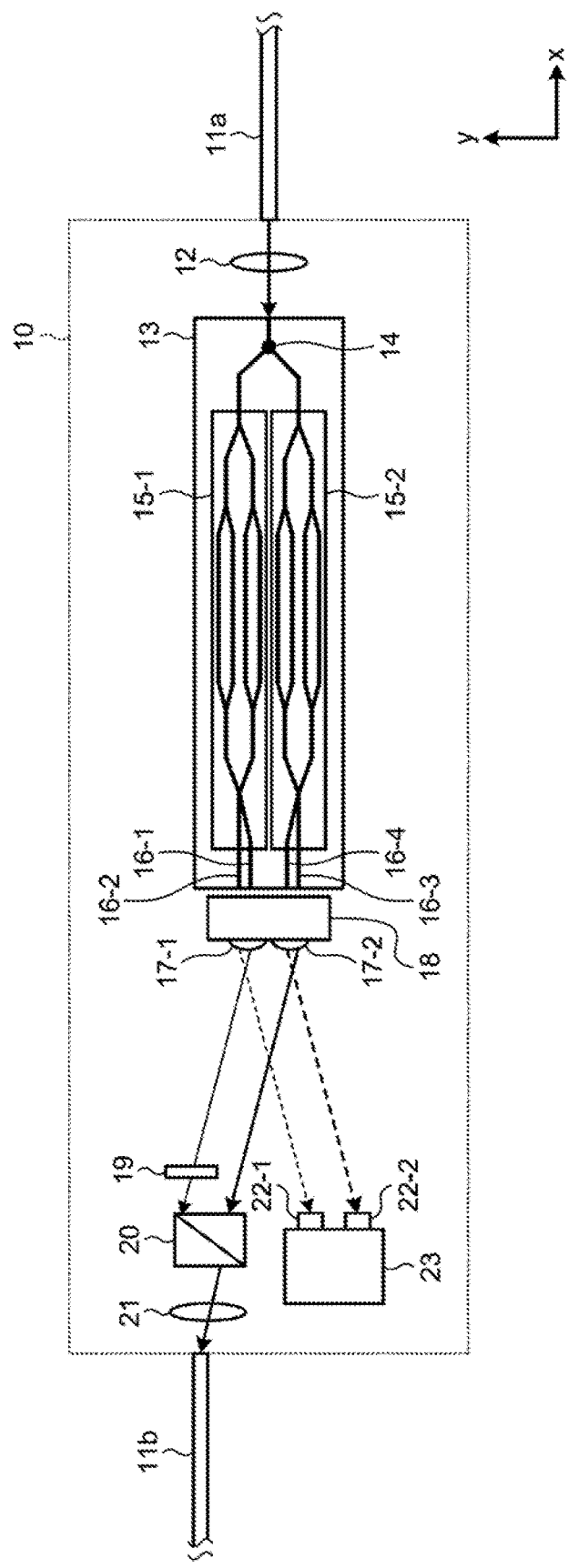
FIG. 1 is a diagram illustrating an example configuration of an optical modulator according to a first embodiment.

FIG. 1 is a diagram illustrating an example configuration of an optical modulator 10 according to a first embodiment. The optical modulator 10 illustrated in FIG. 1 is connected to optical fibers 11a and 11b. Light is input from the optical fiber 11a to the optical modulator 10 and output from the optical modulator 10 to the optical fiber 11b. The optical modulator 10 includes a lens 12, an optical modulation chip 13, lenses 17-1 and 17-2, a retainer 18, a wave plate 19, a polarization beam combiner (PBC) 20, a lens 21, photodetectors (PDs) 22-1 and 22-2, and a fixing member 23.

Referring to FIG. 1, the x-axis is defined along a longitudinal direction of the optical modulation chip 13; the y-axis is defined along a width direction of the optical modulation chip 13. The direction, which lies along the longitudinal direction of the optical modulation chip 13, opposite to the direction from the optical modulation chip 13 toward the lenses 17-1 and 17-2 is assumed as the positive direction of the x-axis. The direction, which lies along the width direction of the optical modulation chip 13, toward the lens 17-1 is assumed as the positive direction of the y-axis.

The lens 12 condenses light emerging from the optical fiber 11a and inputs the condensed light to the optical modulation chip 13.

The optical modulation chip 13, which is a substrate made of, for instance, a semiconductor material, modulates the light input from the lens 12, thereby generating a plurality of modulated beams. Specifically, an optical branching path 14, optical modulation units 15-1 and 15-2, and optical waveguides 16-1 to 16-4 are provided on the optical modulation chip 13.

The optical branching path 14 splits the light input from the lens 12 into two beams, and outputs one of the beams to the optical modulation unit 15-1 and the other to the optical modulation unit 15-2.

The optical modulation units 15-1 and 15-2 are arranged to be parallel to each other, spaced in the width direction of the optical modulation chip 13 or, in other words, in the y-axis direction. The optical modulation units 15-1 and 15-2 are, for instance, Mach-Zehnder waveguides. The optical modulation unit 15-1 splits the beam input from the optical branching path 14 into two beams and superimposes an electrical signal on each of the two beams obtained by the splitting, thereby generating two modulated beams. One of the two modulated beams generated by the optical modulation unit 15-1 serves as a signal beam, while the other modulated beam serves as a monitoring beam for use in monitoring the signal beam. The optical modulation unit 15-1 outputs the signal beam to the optical waveguide 16-1 and outputs the monitoring beam to the optical waveguide 16-2.

The optical modulation unit 15-2 splits the beam input from the optical branching path 14 into two beams and superimposes an electrical signal on each of the two beams obtained by the splitting, thereby generating two modulated beams. One of the two modulated beams generated by the optical modulation unit 15-2 serves as a signal beam, while the other modulated beam serves as a monitoring beam for use in monitoring the signal beam. The optical modulation unit 15-2 outputs the signal beam to the optical waveguide 16-3 and outputs the monitoring beam to the optical waveguide 16-4.

The optical waveguides 16-1 to 16-4 are formed to be parallel to each other, spaced in the width direction of the optical modulation chip 13 or, in other words, in the y-axis direction. The optical waveguide 16-1 and the optical waveguide 16-2 make up a pair. The optical waveguide 16-1 guides the signal beam output from the optical modulation unit 15-1 in the negative direction of the x-axis. The optical waveguide 16-2 guides the monitoring beam output from the optical modulation unit 15-1 in the negative direction of the x-axis. The optical waveguide 16-3 and the optical waveguide 16-4 make up a pair. The optical waveguide 16-3 guides the signal beam output from the optical modulation unit 15-2 in the negative direction of the x-axis. The optical waveguide 16-4 guides the monitoring beam output from the optical modulation unit 15-2 in the negative direction of the x-axis.

The lenses 17-1 and 17-2, each being a collimating lens made of a material (e.g., silicon) that is higher in refractive index than glass, are arranged downstream of the optical waveguides 16-1 to 16-4 to collimate the signal beams and the monitoring beams emerging from the optical waveguides 16-1 to 16-4. The lens 17-1, 17-2 directs the collimated signal beam and the collimated monitoring beam leaving the lens 17-1, 17-2 in directions that differ from each other. Specifically, the lens 17-1, 17-2 directs the collimated signal beam leaving the lens 17-1, 17-2 toward the PBC 20 and directs the collimated monitoring beam leaving the lens 17-1, 17-2 toward a corresponding one of the PDs 22-1 and 22-2. A positional relationship between the lenses 17-1 and 17-2 and the optical waveguides 16-1 to 16-4 and a manner, which depends on the positional relationship, in which beams emerge will be described below.

The retainer 18 retains the lenses 17-1 and 17-2 in an array along the y-axis direction such that an incident surface of the lens 17-1 faces the pair of the optical waveguide 16-1 and the optical waveguide 16-2 and an incident surface of the lens 17-2 faces the pair of the optical waveguide 16-3 and the optical waveguide 16-4. The retainer 18 may be made of a translucent material.

Figure 2:
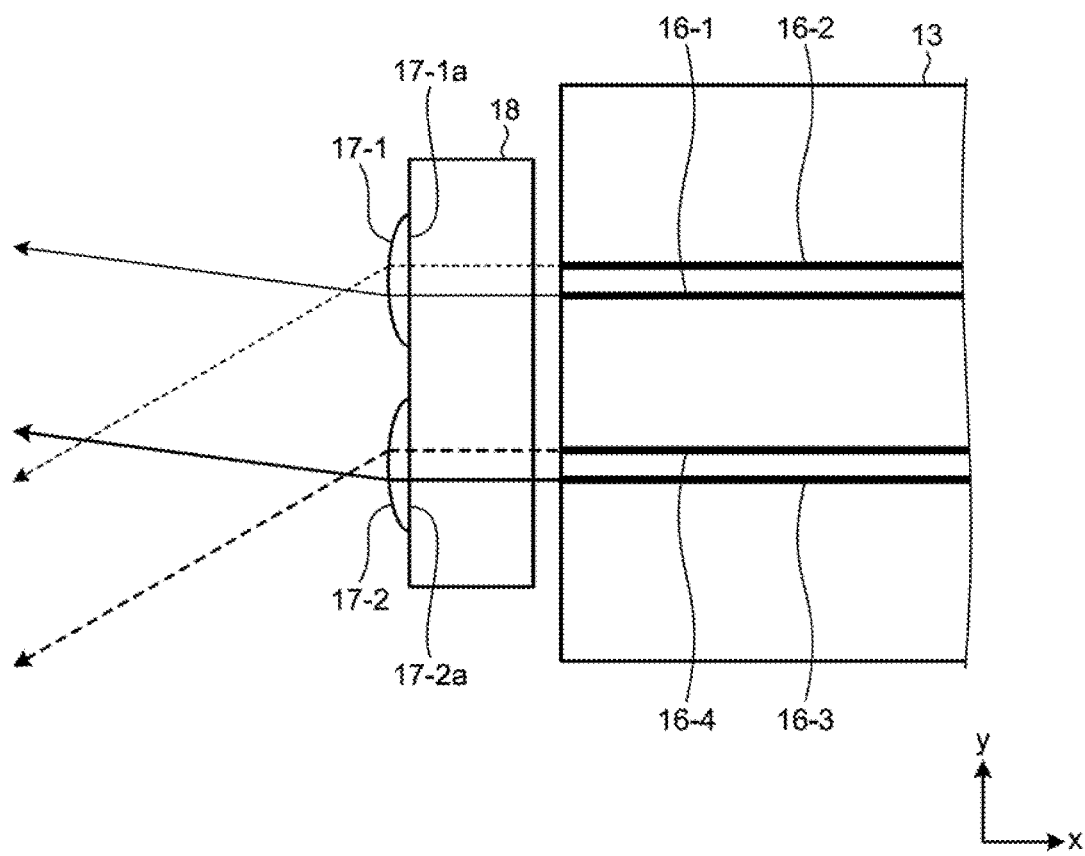
FIG. 2 is a diagram for describing a positional relationship between lenses and optical waveguides and a manner, which depends on the positional relationship, in which beams emerge according to the first embodiment.

A positional relationship between the lenses 17-1 and 17-2 and the optical waveguides 16-1 to 16-4 and a manner, which depends on the positional relationship, in which beams emerge are described below. FIG. 2 is a diagram for describing the positional relationship between the lenses 17-1 and 17-2 and the optical waveguides 16-1 to 16-4 and the manner, which depends on the positional relationship, in which beams emerge according to the first embodiment.

As illustrated in FIG. 2, an incident surface 17-1a of the lens 17-1 faces the pair of the optical waveguide 16-1 and the optical waveguide 16-2. The lens 17-1 collimates the signal beam and the monitoring beam emerging from the pair of the optical waveguide 16-1 and the optical waveguide 16-2 and incident on the incident surface 17-1a at different incident positions and directs the collimated signal beam and the collimated monitoring beam leaving the lens 17-1 in different directions that depend on the incident positions. In the first embodiment, the lens 17-1 directs the collimated signal beam leaving the lens 17-1 toward the PBC 20 and directs the collimated monitoring beam leaving the lens 17-1 toward the PD 22-1.

An incident surface 17-2a of the lens 17-2 faces the pair of the optical waveguide 16-3 and the optical waveguide 16-4. The lens 17-2 collimates the signal beam and the monitoring beam emerging from the pair of the optical waveguide 16-3 and the optical waveguide 16-4 and incident on the incident surface 17-2a at different incident positions and directs the collimated signal beam and the collimated monitoring beam leaving the lens 17-2 in different directions that depend on the incident positions. In the first embodiment, the lens 17-2 directs the collimated signal beam leaving the lens 17-2 toward the PBC 20 and directs the collimated monitoring beam leaving the lens 17-2 toward the PD 22-2.

Thus, arranging a single collimating lens (specifically, the lens 17-1 or the lens 17-2) for each of the pair of the optical waveguide 16-1 and the optical waveguide 16-2 and the pair of the optical waveguide 16-3 and the optical waveguide 16-4 leads to reduction in the number of collimating lenses.

Further description with reference to FIG. 1 is given below. The wave plate 19 rotates polarization of the signal beam emerging from the lens 17-1 relative to polarization of the signal beam emerging from the lens 17-2. The PBC 20, which is a polarization beam combiner, polarization couples the signal beam whose polarization has been rotated by the wave plate 19 and the signal beam emerging from the lens 17-2 and outputs a resultant single signal beam. The lens 21 condenses the signal beam output from the PBC 20 and irradiates the optical fiber 11b with the condensed signal beam.

Each of the PDs 22-1 and 22-2, which are light-receiving elements, receives the monitoring beam that leaves a corresponding one of the lenses 17-1 and 17-2 and is directed in a direction that differs from that of the corresponding signal beam. The fixing member 23 fixes the PDs 22-1 and 22-2 at a position on a side closer to one side surface, which lies along the y-axis direction, of the PBC 20.

As described above, according to the first embodiment, a single collimating lens has an incident surface facing a pair of a signal-beam optical waveguide and a monitoring-beam optical waveguide, collimates a signal beam and a monitoring beam incident on the incident surface at different incident positions, and directs the collimated signal beam and the collimated monitoring beam leaving the collimating lens in different directions that depend on the incident positions. Hence, reduction in the number of collimating lenses as compared with a structure where collimating lenses are arranged in one-to-one correspondence with optical waveguides can be achieved. As a result, apparatus miniaturization can be facilitated. In particular, even when spacing between the signal-beam optical waveguide and the monitoring-beam optical waveguide is smaller than a size of the single collimating lens, it is possible to direct the signal beam and the monitoring beam leaving the collimating lens in different directions. This allows reducing a size of an optical modulation chip in the width direction (i.e., in the y-axis direction).

[b] Second Embodiment

A feature of a second embodiment lies in that optical waveguides are formed on an optical modulation chip such that optical axes of the optical waveguides are tilted relative to an optical axis of a collimating lens to thereby avoid a situation where a beam reflected from a component downstream of the optical waveguides enters one of the optical waveguides.

An optical modulator according to the second embodiment is configurationally similar to the optical modulator 10 according to the first embodiment, and repeated description is omitted. The second embodiment differs from the first embodiment in positional relationship between the lenses 17-1 and 17-2 and the optical waveguides 16-1 to 16-4 and a manner, which depends on the positional relationship, in which beams emerge.

Figure 3:
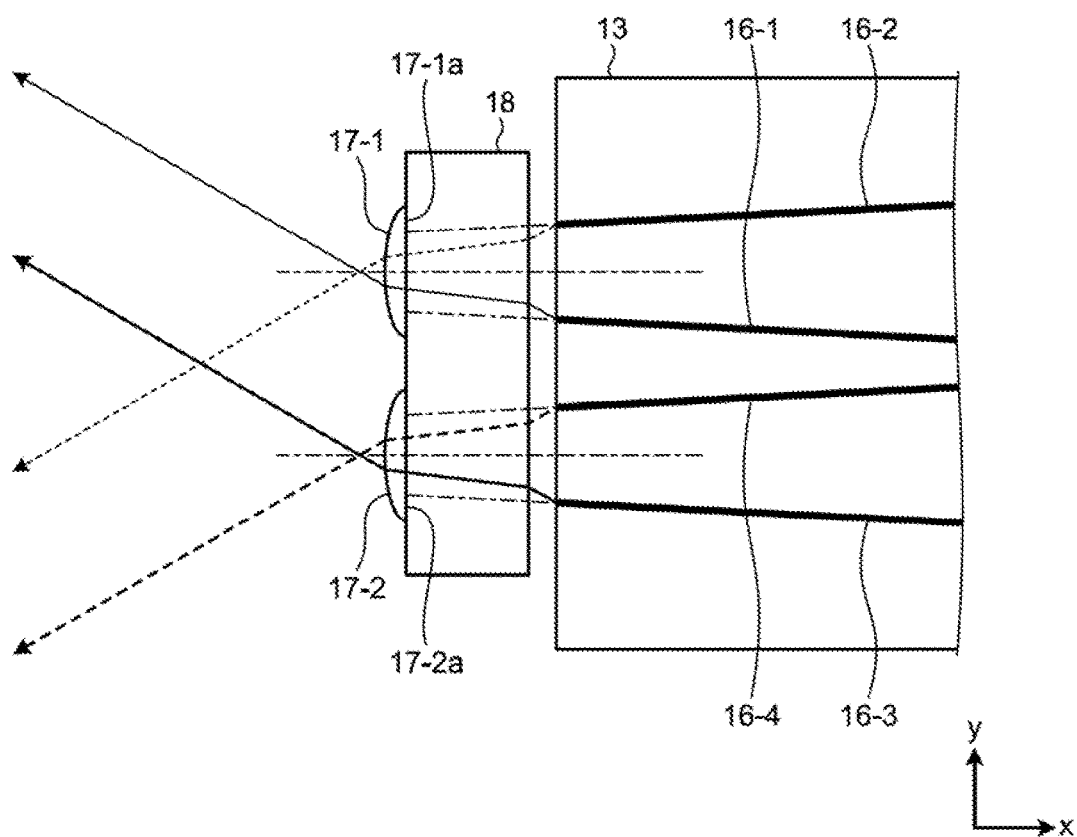
FIG. 3 is a diagram for describing a positional relationship between the lenses and the optical waveguides and a manner, which depends on the positional relationship, in which beams emerge according to a second embodiment.

FIG. 3 is a diagram for describing a positional relationship between the lenses 17-1 and 17-2 and the optical waveguides 16-1 to 16-4 and a manner, which depends on the positional relationship, in which beams emerge according to the second embodiment. In FIG. 3, elements identical to those of FIG. 2 are denoted by like reference characters, and repeated description is omitted. In FIG. 3, alternate long and short dash lines indicate the optical axes of the optical waveguides 16-1 to 16-4 and the optical axes of the lenses 17-1 and 17-2; arrows with solid lines indicate optical paths of signal beams; arrows with dashed lines indicate optical paths of monitoring beams.

As illustrated in FIG. 3, the optical waveguides 16-1 to 16-4 are formed on the optical modulation chip 13 such that each of the optical axes of the optical waveguides 16-1 to 16-4 is tilted relative to an optical axis of a corresponding one of the lenses 17-1 and 17-2. More specifically, the optical waveguide 16-1 that guides a signal beam and the optical waveguide 16-2 that guides a monitoring beam are formed on the optical modulation chip 13 such that both the optical axis of the optical waveguide 16-1 and the optical axis of the optical waveguide 16-2 are tilted relative to the optical axis of the lens 17-1. The optical waveguide 16-3 that guides a signal beam and the optical waveguide 16-4 that guides a monitoring beam are formed on the optical modulation chip 13 such that both the optical axis of the optical waveguide 16-3 and the optical axis of the optical waveguide 16-4 are tilted relative to the optical axis of the lens 17-2.

The lens 17-1 collimates the signal beam and the monitoring beam emerging from the pair of the optical waveguide 16-1 and the optical waveguide 16-2 and incident on the incident surface 17-1a at different incident positions from different incident directions. The lens 17-1 directs the collimated signal beam and the collimated monitoring beam leaving the lens 17-1 in different directions that depend on the incident positions and the incident directions. In the second embodiment, the lens 17-1 directs the collimated signal beam leaving the lens 17-1 toward the PBC 20 and directs the collimated monitoring beam leaving the lens 17-1 toward the PD 22-1.

The lens 17-2 collimates the signal beam and the monitoring beam emerging from the pair of the optical waveguide 16-3 and the optical waveguide 16-4 and incident on the incident surface 17-2a at different incident positions from different incident directions. The lens 17-2 directs the collimated signal beam and the collimated monitoring beam leaving the lens 17-2 in different directions that depend on the incident positions and the incident directions. In the second embodiment, the lens 17-2 directs the collimated signal beam leaving the lens 17-2 toward the PBC 20 and directs the collimated monitoring beam leaving the lens 17-2 toward the PD 22-2.

As described above, according to the second embodiment, a signal-beam optical waveguide and a monitoring-beam optical waveguide are formed on an optical modulation chip such that both an optical axis of the signal-beam optical waveguide and an optical axis of the monitoring-beam optical waveguide are tilted relative to an optical axis of a corresponding single collimating lens. Hence, a situation where a beam reflected from component (e.g., the lens 17-1, the lens 17-2, or the retainer 18) downstream of the signal-beam optical waveguide enters the signal-beam optical waveguide or the monitoring-beam optical waveguide can be avoided. As a result, production of reflected light, which is a part of light input to the optical modulator 10, that is reflected to return to the optical fiber 11a can be at least reduced.

In the second embodiment, both the optical axis of the optical waveguide 16-1 and the optical axis of the optical waveguide 16-2 are tilted relative to the optical axis of the lens 17-1. However, at least any one of the optical axis of the optical waveguide 16-1 and the optical axis of the optical waveguide 16-2 may be tilted relative to the optical axis of the lens 17-1.

In the second embodiment, both the optical axis of the optical waveguide 16-3 and the optical axis of the optical waveguide 16-4 are tilted relative to the optical axis of the lens 17-2. However, at least any one of the optical axis of the optical waveguide 16-3 and the optical axis of the optical waveguide 16-4 may be tilted relative to the optical axis of the lens 17-2.

[c] Third Embodiment

A feature of a third embodiment lies in that an incident surface of a single collimating lens faces a pair of a signal-beam optical waveguide and a monitoring-beam optical waveguide, and another monitoring-beam optical waveguide; and the collimating lens directs a signal beam and two monitoring beams leaving the collimating lens in different directions that depend on incident positions on the incident surface.

Figure 4:
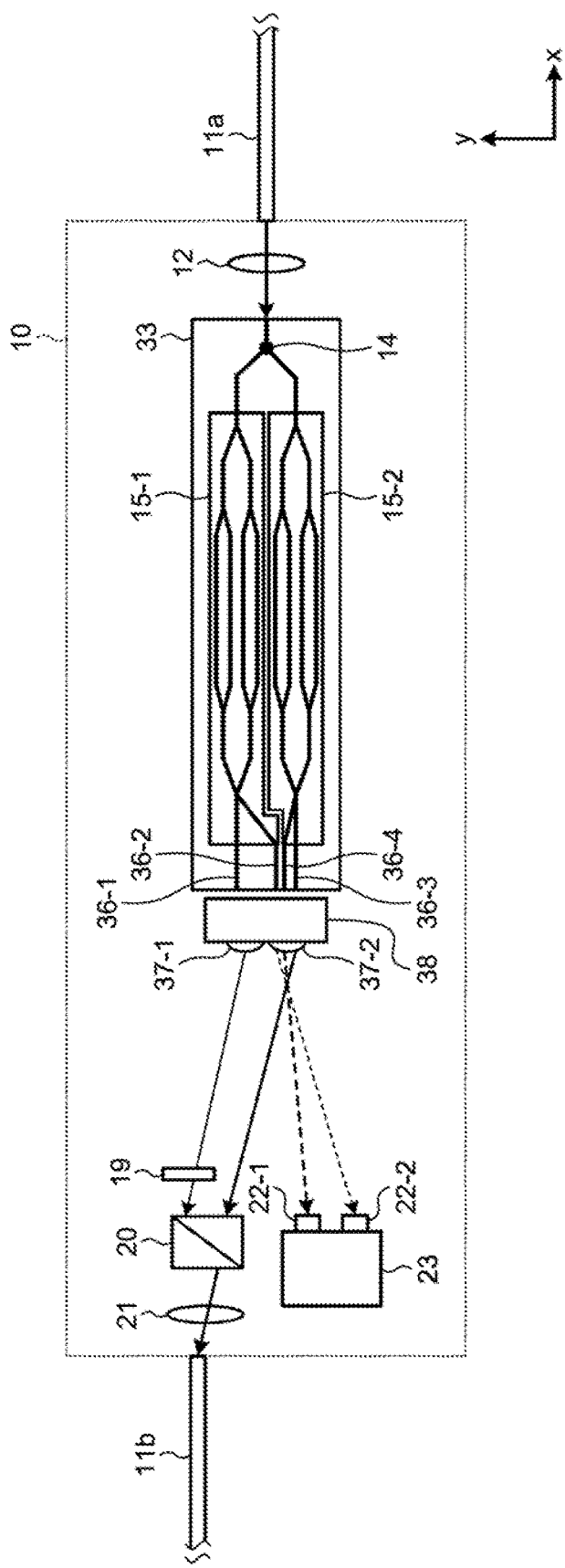
FIG. 4 is a diagram illustrating an example configuration of the optical modulator according to a third embodiment.

FIG. 4 is a diagram illustrating an example configuration of the optical modulator 10 according to the third embodiment. In FIG. 4, elements identical to those of FIG. 1 are denoted by like reference characters, and repeated description is omitted.

The optical modulator 10 illustrated in FIG. 4 includes, in lieu of the optical modulation chip 13, the lenses 17-1 and 17-2, and the retainer 18 illustrated in FIG. 1, an optical modulation chip 33, lenses 37-1 and 37-2, and a retainer 38.

The optical modulation chip 33, which is a substrate made of a semiconductor material, for instance, modifies light input from the lens 12, thereby generating a plurality of modulated beams. Specifically, the optical branching path 14, the optical modulation units 15-1 and 15-2, and optical waveguides 36-1 to 36-4 are provided on the optical modulation chip 33.

The optical waveguides 36-1 to 36-4 basically correspond to the optical waveguides 16-1 to 16-4 illustrated in FIG. 1. The optical waveguide 36-1 and the optical waveguide 36-2 make up a pair. The optical waveguide 36-1 guides a signal beam output from the optical modulation unit 15-1 in the negative direction of the x-axis. The optical waveguide 36-2 guides a monitoring beam output from the optical modulation unit 15-1 in the negative direction of the x-axis. The optical waveguide 36-3 and the optical waveguide 36-4 make up a pair. The optical waveguide 36-3 guides a signal beam output from the optical modulation unit 15-2 in the negative direction of the x-axis. The optical waveguide 36-4 guides a monitoring beam output from the optical modulation unit 15-2 in the negative direction of the x-axis. Furthermore, in the third embodiment, the optical waveguides 36-2 and 36-4 that guide the monitoring beams are sandwiched, in the y-axis direction, between the optical waveguides 36-1 and 36-3 that guide the signal beams.

The lenses 37-1 and 37-2, each being a collimating lens made of a material (e.g., silicon) that is higher in refractive index than glass, are arranged downstream of the optical waveguides 36-1 to 36-4 to collimate the signal beams and the monitoring beams emerging from the optical waveguides 36-1 to 36-4. The lens 37-2 directs a collimated signal beam and two collimated monitoring beams leaving the lens 37-2 in directions that differ from one another. Specifically, the lens 37-2 directs the collimated signal beam leaving the lens 37-2 toward the PBC 20 and directs each of the two collimated monitoring beams leaving the lens 37-2 toward a corresponding one of the PDs 22-1 and 22-2. A positional relationship between the lenses 37-1 and 37-2 and the optical waveguides 36-1 to 36-4 and a manner, which depends on the positional relationship, in which beams emerge will be described below.

The retainer 38 retains the lenses 37-1 and 37-2 in an array along the y-axis direction such that an incident surface of the lens 37-2 faces the pair of the optical waveguide 36-3 and the optical waveguide 36-4, and the optical waveguide 36-2, and an incident surface of the lens 37-1 faces the optical waveguide 36-1.

Figure 5:
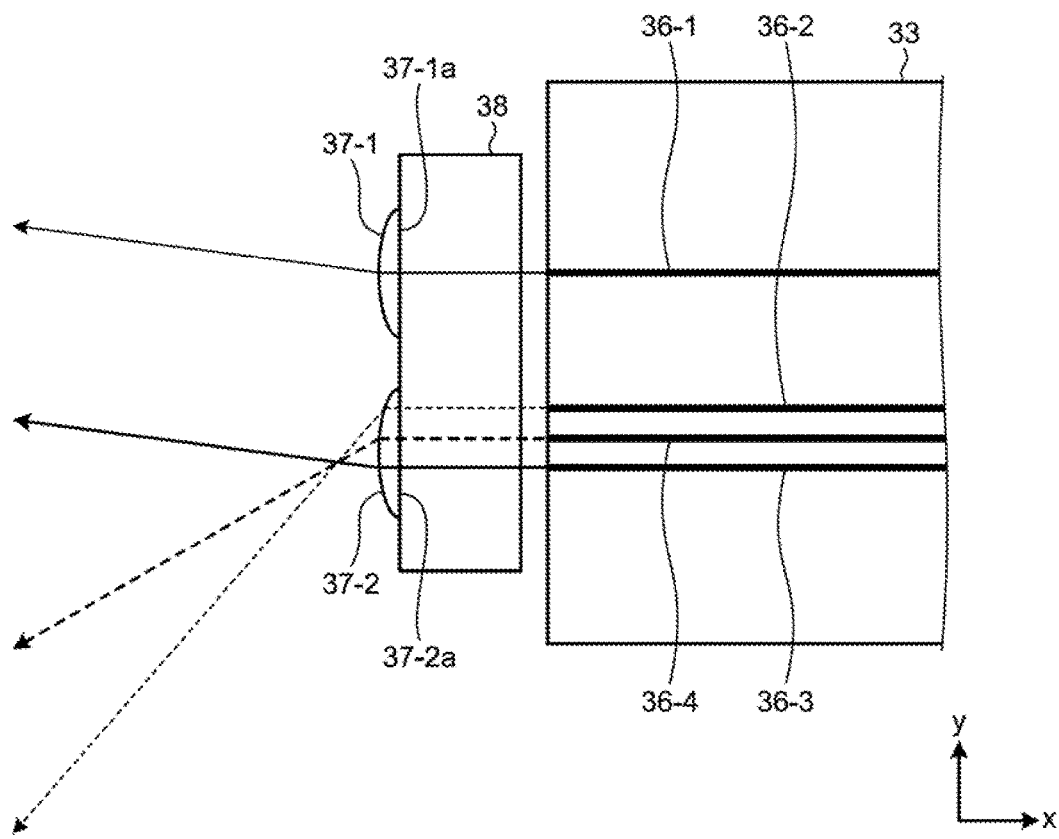
FIG. 5 is a diagram for describing a positional relationship between lenses and optical waveguides and a manner, which depends on the positional relationship, in which beams emerge according to the third embodiment.

A positional relationship between the lenses 37-1 and 37-2 and the optical waveguides 36-1 to 36-4 and a manner, which depends on the positional relationship, in which beams emerge are described below. FIG. 5 is a diagram for describing the positional relationship between the lenses 37-1 and 37-2 and the optical waveguides 36-1 to 36-4 and the manner, which depends on the positional relationship, in which beams emerge according to the third embodiment.

As illustrated in FIG. 5, an incident surface 37-1a of the lens 37-1 faces the optical waveguide 36-1. The lens 37-1 collimates a signal beam emerging from the optical waveguide 36-1 and incident on the incident surface 37-1a and directs the collimated signal beam leaving the lens 37-1 in a predetermined direction. In the third embodiment, the lens 37-1 directs the collimated signal beam leaving the lens 37-1 toward the PBC 20.

An incident surface 37-2a of the lens 37-2 faces the pair of the optical waveguide 36-3 and the optical waveguide 36-4, and the optical waveguide 36-2. The lens 37-2 collimates a signal beam and two monitoring beams emerging from the pair of the optical waveguide 36-3 and the optical waveguide 36-4, and the optical waveguide 36-2 and incident on the incident surface 37-2a at different incident positions, and directs the collimated signal beam and the two collimated monitoring beams leaving the lens 37-2 in different directions that depend on the incident positions. In the third embodiment, the lens 37-2 directs the collimated signal beam leaving the lens 37-2 toward the PBC 20 and directs each of the two collimated monitoring beams leaving the lens 37-2 toward a corresponding one of the PDs 22-1 and 22-2.

Thus, arranging a single collimating lens (specifically, the lens 37-2) for the pair of the optical waveguide 36-3 and the optical waveguide 36-4, and the optical waveguide 36-2 leads to reduction in the number of collimating lenses.

As described above, according to the third embodiment, a single collimating lens has an incident surface facing a pair of a signal-beam optical waveguide and a monitoring-beam optical waveguide, and another monitoring-beam optical waveguide, and directs a signal beam and two monitoring beams leaving the collimating lens in different directions that depend on incident positions on the incident surface. Hence, reduction in the number of collimating lenses as compared with a structure where collimating lenses are arranged in one-to-one correspondence with optical waveguides can be achieved. As a result, apparatus miniaturization can be facilitated. Furthermore, because the signal beam and the two monitoring beams leaving the single collimating lens are directed in different directions, the emergent directions of the signal beam and the two monitoring beams can be set as desired irrespective of variation in curvature radius, which may vary from one collimating lens to another, of the collimating lens.

In the first and second embodiments, the collimating lens collimates a signal beam and a monitoring beam emerging from the pair of the signal-beam optical waveguide and the monitoring-beam optical waveguide and incident on the incident surface at different incident positions (and from different incident directions); however, a way of collimation by the collimating lens is not limited thereto. The collimating lens may alternatively be configured to collimate a signal beam and a monitoring beam emerging from the pair of the signal-beam optical waveguide and the monitoring-beam optical waveguide and incident on the incident surface such that the signal beam and the monitoring beam differ from each other in at least any one of the incident position and the incident direction.

In each of the above-described embodiments, it is assumed that the width, which lies along the width direction of the optical modulation chip, of the monitoring-beam optical waveguide (e.g., the optical waveguide 16-1, 16-4) is uniform. However, the width is not necessarily uniform. The monitoring-beam optical waveguide may alternatively be configured such that the width of the monitoring-beam optical waveguide lying along the width direction of the optical modulation chip is widened or narrowed toward an exit end of the monitoring-beam optical waveguide. This configuration allows appropriately adjusting a mode field diameter of the monitoring beam.

An optical modulator according to an aspect of the present disclosure can advantageously facilitate apparatus miniaturization.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising:
    a substrate with a plurality of pairs of optical waveguides formed thereon, the pairs being parallel to each other, spaced in a width direction of the substrate, each pair being made up of a first optical waveguide that guides a first beam and a second optical waveguide that guides a second beam for use in monitoring the first beam; and
    at least one collimating lens, each collimating lens having an incident surface facing at least one pair of the plurality of pairs of optical waveguides, collimating, for each of the at least one pair, the first beam emerging from the pair and incident on the incident surface from an incident direction at an incident position and the second beam emerging from the pair and incident on the incident surface from an incident direction at an incident position, the first beam and the second beam differing from each other in at least any one of the incident position and the incident direction, and directing the first beam and the second beam having been collimated and leaving the at least one collimating lens in different directions that depend on, when the first beam and the second beam differ from each other in one of the incident position and the incident direction, the one of the incident position and the incident direction and that depend on, when the first beam and the second beam differ from each other in both of the incident position and the incident direction, the both of the incident position and the incident direction, wherein
    spacing between the first optical waveguide and the second optical waveguide is smaller than a size of each of the at least one collimating lens in the width direction of the substrate,
    each of the at least one collimating lens direct the first beam and the second beam in the different directions so that the first beam and the second beam intersect each other, and
    a number of the at least one collimating lens is smaller than a total number of the optical waveguides belonging to the plurality of the pairs.

2. The optical module according to claim 1, wherein the first optical waveguide and the second optical waveguide are formed on the substrate such that at least any one of an optical axis of the first optical waveguide and an optical axis of the second optical waveguide is tilted relative to an optical axis of the lens.

3. The optical module according to claim 1, wherein the at least one lens includes a plurality of lenses, the optical module further comprising:
    a polarization beam combiner that polarization couples the first beams leaving the plurality of lenses, each first beam leaving one of the plurality of lenses in an emergent direction;
    a plurality of light-receiving elements that receive, in a one-to-one correspondence manner, the second beams leaving the plurality of lenses, each of the second beams leaving one of the plurality of lenses in an emergent direction that differs from the emergent direction of the first beam; and
    a fixing member that fixes the plurality of light-receiving elements at a position on a side closer to one side surface, the one side surface lying along the width direction of the substrate, of the polarization beam combiner.

4. The optical module according to claim 1, further comprising a retainer that retains the plurality of lenses in an array, wherein the plurality of lenses are spaced in the width direction of the substrate, such that an incident surface of each of the plurality of lenses faces at least one pair of the plurality of pairs of optical waveguides.

5. The optical module according to claim 1, wherein a width, the width lying along the width direction of the substrate, of the second optical waveguide increases or decreases toward an exit end of the second optical waveguide.

6. The optical module according to claim 1, wherein
    the incident surface of the lens faces at least one pair of the plurality of pairs of optical waveguides and an adjacent optical waveguide, the adjacent optical waveguide being the second optical waveguide belonging to another pair adjacent to the at least one pair, and
    the lens collimates the first beam emerging from the pair and incident on the incident surface from an incident direction at an incident position, and the second beam emerging from the pair and the second beam emerging from the adjacent optical waveguide, each of the two second beams being incident on the incident surface from an incident direction at an incident position, the first beam and the two second beams differing from one another in at least any one of the incident position and the incident direction, and directs the first beam and the two second beams having been collimated and leaving the lens in different directions that depend on , when the first beam and the second beam differ from each other in one of the incident position and the incident direction, the one of the incident position and the incident direction and that depend on, when the first beam and the second beam differ from each other in both of the incident position and the incident direction, the both of the incident position and the incident direction.

7. The optical module according to claim 6, further comprising a retainer that retains the lens and another lens in an array, wherein the lens and the other lens are spaced in the width direction of the substrate, such that the incident surface of the lens faces the at least one pair of the plurality of pairs of optical waveguides and the adjacent optical waveguide, and an incident surface of the other lens faces the first optical waveguide belonging to the other pair.

* * * * *